Figure 1:
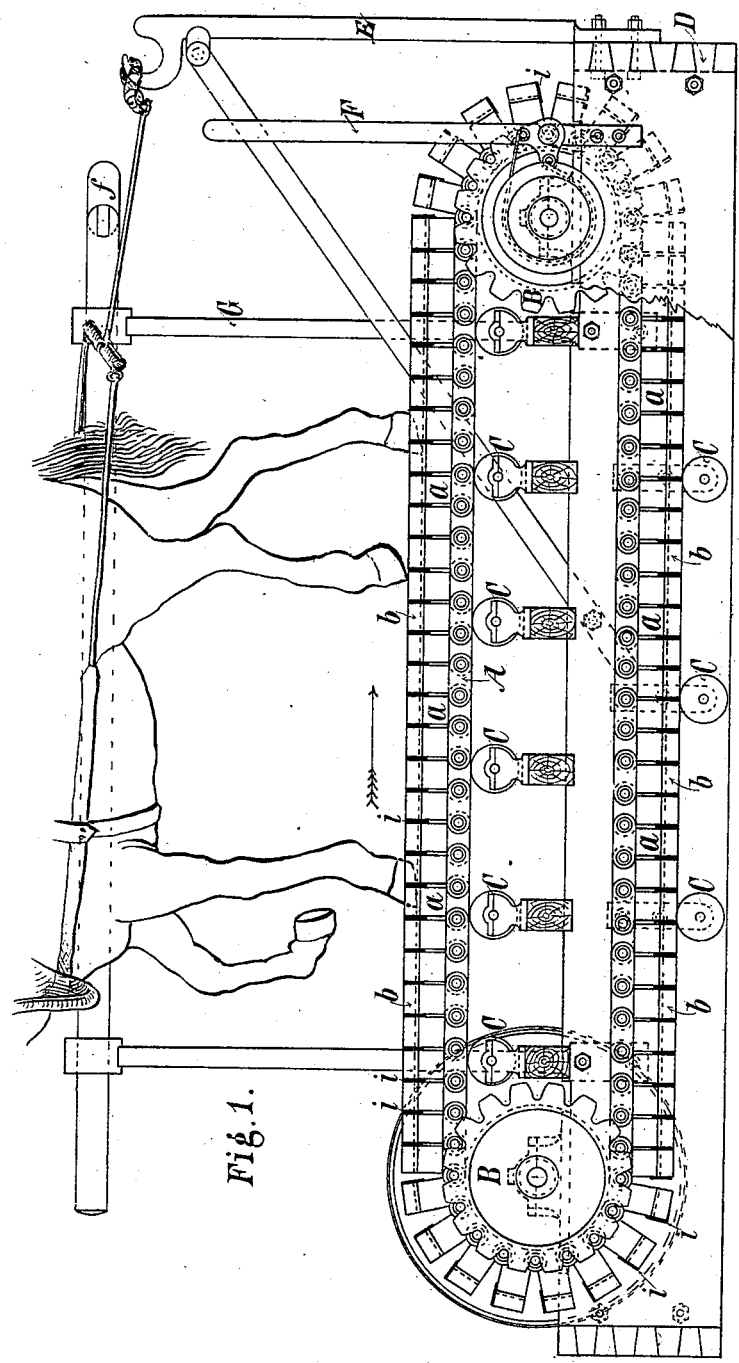

(No Model.) 3 Sheets—Sheet 1.

O. LEINBROCK.
TREAD MOTOR.

No. 254,665. Patented Mar. 7, 1882.

Witnesses.
A. Thomson
John F. Allen

Inventor.
Oskar Leinbrock
per Henry E. Roeder
Attorney (No Model.) 3 Sheets—Sheet 2.
O. LEINBROCK.
TREAD MOTOR.
No. 254,665. Patented Mar. 7, 1882.
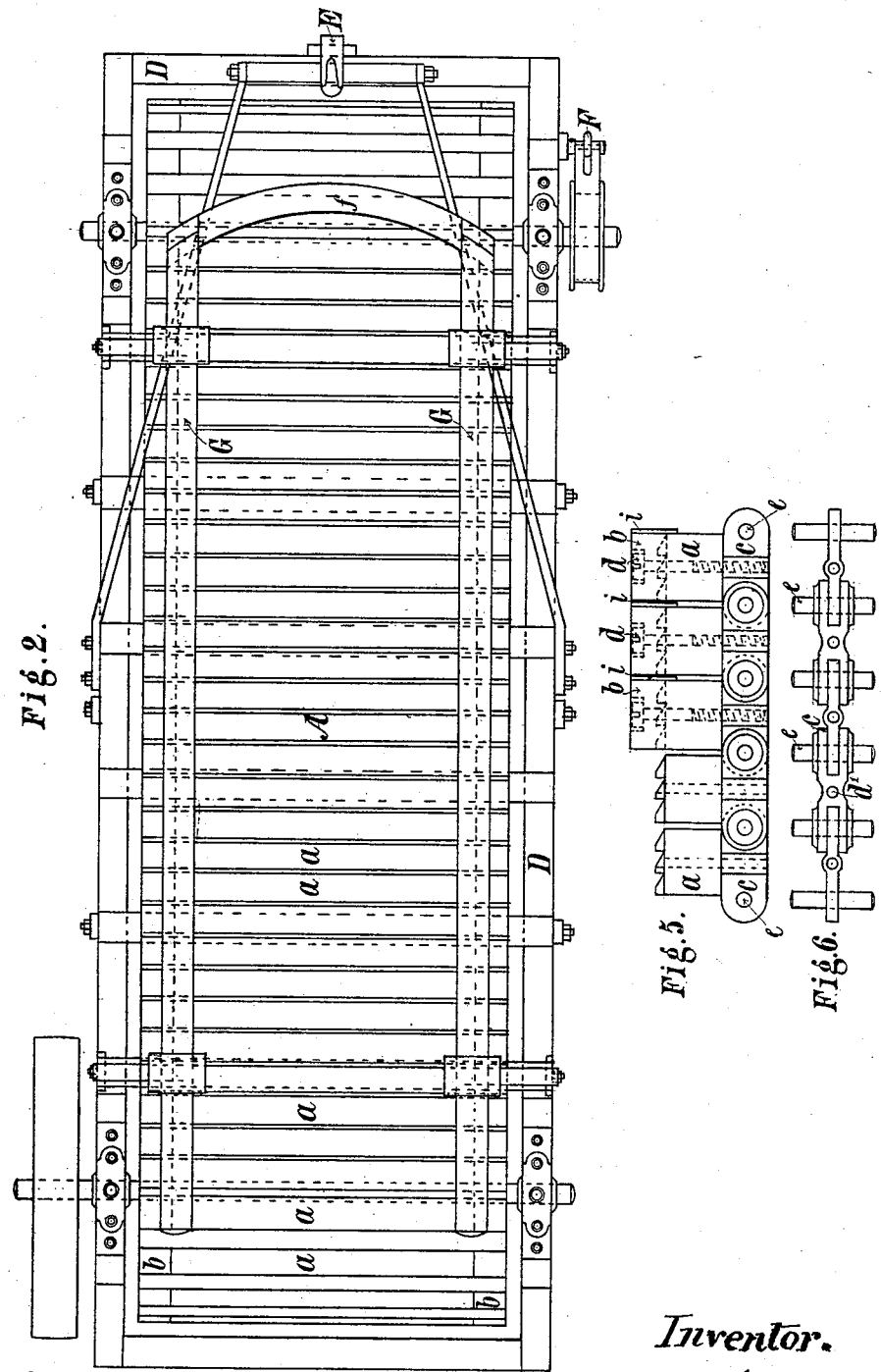
Witnesses
A. Thomson
John F. Allen
Inventor.
Oskar Leinbrock
per Henry E. Roeder
Attorney

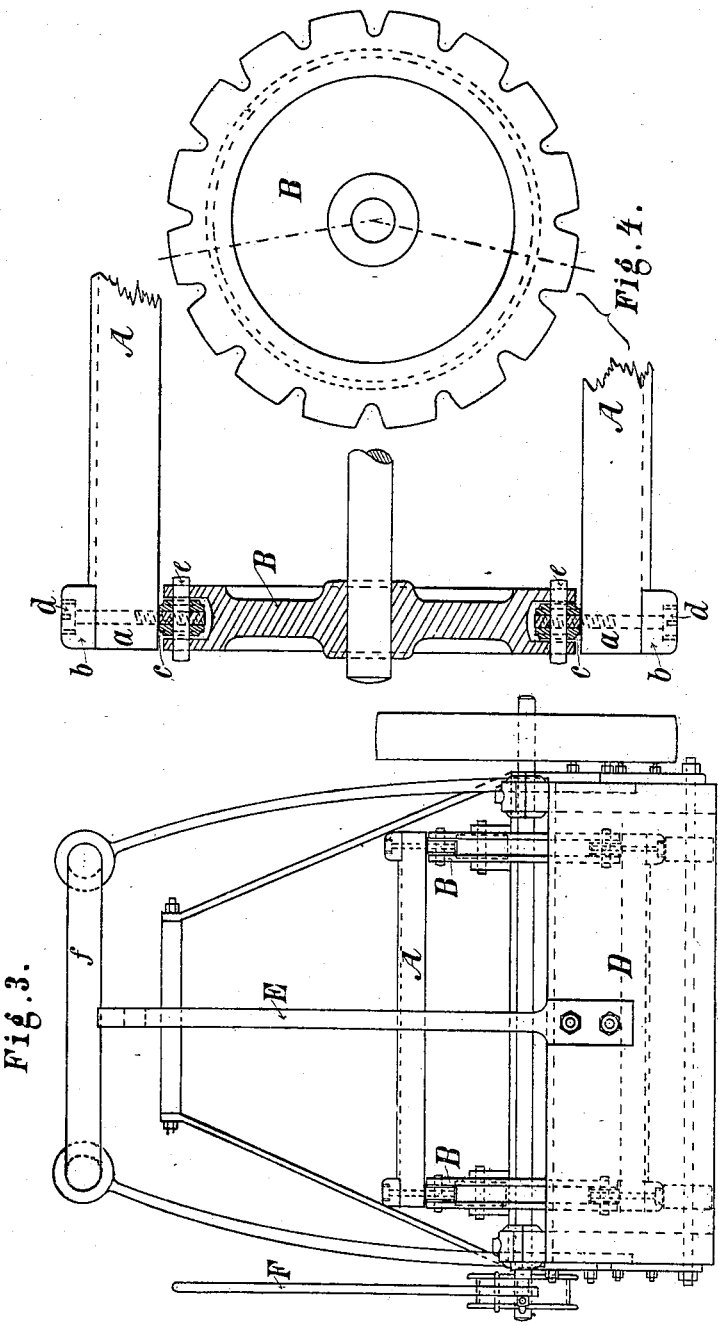

UNITED STATES PATENT OFFICE.

OSKAR LEINBROCK, OF GOTTLEUBA, NEAR DRESDEN, SAXONY, GERMANY.

TREAD-MOTOR.

SPECIFICATION forming part of Letters Patent No. 254,665, dated March 7, 1882.

Application filed October 26, 1881. (No model.)

*To all whom it may concern:*

Be it known that I, OSKAR LEINBROCK, a subject of the King of Saxony, residing at Gottleuba, near Dresden, in the Kingdom of Saxony, Germany, have invented a new and useful Tread-Motor, of which the following is a specification.

My invention relates to improvements in tread-motors for horses or other cattle for draft; and the objects of my improvements are, first, to provide a tread-motor with an endless band or chain moved by the drawing-horses and transmitting the motion to any kind of machinery; and, second, to make noiseless the traveling motion of the endless band. I attain these objects by the mechanism illustrated in the accompanying drawings, in which—

Figure 1 is a side elevation of the machine; Fig. 2, a top view of the machine; Fig. 3, an end view of the machine; and Figs. 4, 5, and 6 are detailed views of single parts of the machine.

Similar letters refer to similar parts throughout the several views.

The horse stands upon the platform formed by the endless band A, and is hitched to the post E. The four pulleys B, Figs. 1 and 3, around which the endless band A passes, are mounted on two shafts the bearings of which are carried by the frame D.

To the frame D are also attached the rollers C, supporting the endless band A. The horse, having been incited, makes efforts to draw away the post E; but this being rigidly secured to the frame D, the draft has only the effect that the endless band A makes a traveling motion in the direction indicated by the arrow, Fig. 1. The horse's eyes being covered by winkers, consequently unable to see anything, fancies to draw in the usual manner, and causes by so doing a continuous movement of the endless band, which is transmitted to the shafts of the pulleys B, and by these to any kind of machinery.

The endless band A is constituted in the following manner: The two endless chains $c$, the pins $e$ of which enter corresponding grooves of the pulleys B, carry the cross-laths $a$. Both ends of the cross-laths $a$ are provided with a little ledge, $b$, preventing the horse from gliding off. For the same purpose the upper part of the body of the horse is surrounded by a fence, G, secured to the frame D.

The links of the endless chains have holes $d'$, provided with female thread. The cross-laths $a$ and the ledges $b$ are attached by means of the same screw-bolts $d$ to the links of the endless chains $c$.

The surfaces of the laths $a$ are grooved in the manner shown in Fig. 5, for being caught more securely by the hoofs of the horse.

If the operation of the motor is to be discontinued, the horse is stopped, and simultaneously the shaft of the pulley B, stopped by means of the brake F, ceases to revolve. The cross-bar $f$, secured to the fence G, prevents the horses from being drawn back by the inertia of the endless band A.

To the heads of the ledges $b$ small plates $i$, of leather or felt, are attached, which make noiseless the working of the machine.

I am aware that prior to my invention tread-motors have been made with traveling platforms moved by cattle for draft. I therefore do not claim such a combination broadly; but What I do claim as my invention, and desire to secure by Letters Patent, is—

1. In a tread-motor, the combination of the four pulleys B with the endless band A, consisting of two endless chains, $c$, to the links of which the cross-laths $a$ and the ledges $b$ are secured, the plates $i$, attached to the heads of the ledges $b$, the frame D surrounding and supporting the entire machine, the guiding-wheels C, and the post E, to which the horses or cattle for draft are attached, the whole being arranged in the manner and for the purpose substantially as described.

2. The ledges $b$, having small plates $i$ attached to their heads, as described, for the purpose specified.

OSKAR LEINBROCK.

Witnesses:
 JULIUS WILH. CHEUTIER,
 PAUL DRUCKEMILLER.